US009304497B2

(12) United States Patent
Liu

(10) Patent No.: US 9,304,497 B2

(45) Date of Patent: Apr. 5, 2016

(54) INTERFERENCE-FREE MULTIFUNCTIONAL METRONOME FOR RHYTHM CONDUCTING

(71) Applicant: Wangping Liu, Yiyang (CN)

(72) Inventor: Wangping Liu, Yiyang (CN)

(73) Assignee: Hong Wang, Shenzhen (CN)

( * ) Notice: Subject to any disclaimer, the term of this patent is extended or adjusted under 35 U.S.C. 154(b) by 0 days.

(21) Appl. No.: 14/634,725

(22) Filed: Feb. 28, 2015

(65) Prior Publication Data

US 2015/0177700 A1 Jun. 25, 2015

Related U.S. Application Data

(63) Continuation of application No. PCT/CN2012/082121, filed on Sep. 27, 2012.

(30) Foreign Application Priority Data

Sep. 7, 2012 (CN) .......................... 2012 1 0328624

(51) Int. Cl.

| | |
|---|---|
| ***G09B 15/00*** | (2006.01) |
| ***G04F 5/02*** | (2006.01) |
| ***G10H 3/00*** | (2006.01) |
| ***G10G 1/00*** | (2006.01) |
| ***G10G 7/00*** | (2006.01) |
| ***G10H 1/40*** | (2006.01) |

(52) U.S. Cl.

CPC ................ *G04F 5/025* (2013.01); *G04F 5/027* (2013.01); *G10G 1/00* (2013.01); *G10G 7/00* (2013.01); *G10H 1/40* (2013.01); *G10H 3/00* (2013.01)

(58) Field of Classification Search

CPC ............ G04F 5/027; G10G 1/00; G10G 7/00; G10H 1/40; G10H 3/00

See application file for complete search history.

(56) References Cited

U.S. PATENT DOCUMENTS 2,184,728 A * 12/1939 Aalberg .................. G04F 5/027 200/19.2
2,375,294 A * 5/1945 Engel ...................... G04F 5/022 84/484
2,555,748 A * 6/1951 Koenigsberger ........ G04F 5/027 477/15
2,715,841 A * 8/1955 Frederick ................ G04F 5/027 476/55
2,841,950 A * 7/1958 Alexander .............. G04F 5/027 84/484
3,406,604 A * 10/1968 Stickley .................... G04F 5/02 84/484

(Continued)

*Primary Examiner* — Robert W Horn

(74) *Attorney, Agent, or Firm* — Wayne & King LLC

(57) ABSTRACT

The present invention provides an interference-free multi-functional metronome for rhythm conducting, comprising a bottom plate, a control switch with a plug and a controller of a stepping motor, with a drive of the stepping motor, a DC switch power supply I, a stepping motor, a transmission mechanism, a driving mechanism and a pedal being provided on the bottom plate; the control switch with a plug is connected to the controller of the stepping motor through a circuit; the controller of the stepping motor is connected to the drive of the stepping motor and the DC switch power supply I through circuits, respectively; the drive of the stepping motor is connected to the DC switch power supply I and the stepping motor through circuits, respectively; the output shaft of the stepping motor is connected to the transmission mechanism; the transmission mechanism is connected to the driving mechanism; and, the driving mechanism is connected to the pedal through a connector. With the interference-free multi-functional metronome for rhythm conducting provided by the present invention, a music learner can master the rhythm better and more quickly, and the creation of music can be facilitated greatly, and more importantly, no adverse impact will be caused to users after long-term use.

10 Claims, 4 Drawing Sheets

(56) References Cited

U.S. PATENT DOCUMENTS

| | | | | | |
|---|---|---|---|---|---|
| 3,412,197 | A * | 11/1968 | Weitzner | G04F 5/02 | 340/384.1 |
| 3,463,043 | A * | 8/1969 | Keir | G09B 15/026 | 84/470 R |
| 3,541,916 | A * | 11/1970 | Reid, Sr. | G04F 5/02 | 84/484 |
| 3,664,225 | A * | 5/1972 | Robertson | G04F 5/027 | 84/484 |
| 3,760,681 | A * | 9/1973 | Kennedy | G11B 33/06 | 84/484 |
| 4,749,923 | A * | 6/1988 | Chieng | D05B 69/22 | 318/254.1 |
| 5,382,891 | A * | 1/1995 | Huffener | G10H 1/40 | 318/269 |
| 6,201,769 | B1 * | 3/2001 | Lewis | G04F 5/025 | 368/10 |
| 2015/0177700 | A1 * | 6/2015 | Liu | G04F 5/027 | 84/484 |

* cited by examiner

INTERFERENCE-FREE MULTIFUNCTIONAL METRONOME FOR RHYTHM CONDUCTING

CROSS-REFERENCE TO RELATED APPLICATIONS

This application is a continuation-in-past of International Patent Application No. PCT/CN2012082121 with an international filing date of Sep. 27, 2012, designating the United States, now pending, and further claims priority benefits to Chinese Patent Application No. 201210328624.7 filed Sep. 7, 2012. The contents of all of the aforementioned applications, including any intervening amendments thereto, are incorporated herein by reference.

TECHNICAL FIELD

The present invention relates to a metronome, in particular to interference-free multifunctional metronome for rhythm conducting.

BACKGROUND OF THE PRESENT INVENTION

In 1800, with the expansion of music performances in scale, to better keep performers consistent on beat, conductors began to use batons by which performances gain great success and historical affirmation. In 1816, J. N. Maelzel, a German renowned machinist, made the first modern clockwork metronome on the basis of the idea of D. N. Winkel, a Dutch inventor, and was granted with the patent right. With the advance of science and technology, electronic metronomes arise recently.

However, such metronomes have a common disadvantage that they will continuously sound “Da-Da-Da” when in use. There has been research done by psychologists which explains that in this case, the brain of a person will generate a counterforce naturally such that the person will generate illusion and can not even hear the sound of a metronome, thereby causing interference to users. Meanwhile, as the users are required to follow the swing of a pendulum bob side to side and the flicker of the indicator of an electronic metronome with their eyes, the harmony of their performances will be often influenced. Music is a body language, and the metronome does not serve any function at all during the actual teaching process. A teacher in the actual teaching process accurately controls the rhythm by beating with his/her hands to realize the teaching objectives, and absolutely no teachers will teach particularly beginners by using a metronome. Apparently, no sound metronome can realize this. Moreover, in the case that a sound metronome is used during a performance, the slower the beat points are, the harder for the students to accurately represent the rhythm relations by body movements because it is more likely to confuse each note in each beat in the mind. The students can achieve a simulation effect only when feeling the rhythm by listening even through the teacher himself plays those easy to make mistakes for students. Simulation effect means that an approximate speed and rough feeling of a note will be left in the mind of a student after listening to the performance of a teacher, and this student will take this speed and feeling as a reference in the subsequent practices. This will bring a hidden risk of learning to play a song quicker at easy parts but slower at difficult parts. A sound metronome serves as a tool to check the students and performers. Even through a sound metronome is used in some practices, the students are greatly influenced as they need to always pay attention to and predict the time when the sound “Da-Da-Da” occurs, and are also unable to focus due to the interferential sound. As a result, they can not follow the rhythm accurately in the practices, either a little bit slow or fast. In this way, it is difficult for students to effectively make a progress and master the rule of rhythm. This is so-called simulation effect. Students may really realize high-efficiency and accurately find the rhythm relation depending on long-term slow practices. It is difficult to correct some places that do not feel right, because the wrong rhythm of this song has been already formed in the mind of a student and his/her body movement will be controlled by the wrong rhythm. Therefore, a sound metronome absolutely can not realize the teaching objectives. An existing metronome forms rhythm by means of sound, so the learners have to master the rhythm relation in a song by predicting a time interval of the sound arrival in their mind. As a result, the learners can not focus on learning, and the sound seriously influences the capacities of the learners for thinking. In this way, the learners are unable to focus on learning and to feel the rhythm well. Meanwhile, for students who just begin to learn to read the notes and try to play a song, a metronome provides them nothing but heavy interference. Unlike a baton, a metronome, the beating time of which depends on sound, has no any rhythm conducting function and is thus meaningless to particularly beginners. For a beginner, inappropriately using a metronome will restrict his/her imaginations.

It is considered by psychologists in the music sector that, it is bad for skill learning after long-time or long-term inappropriate use of metronomes, and more seriously, a user may even become a slave of metronomes like a robot.

SUMMARY OF THE PRESENT INVENTION

The technical problem to be solved in the present invention is to provide an interference-free multifunctional metronome for rhythm conducting.

The present invention employs the following technical solution to solve the technical problem mentioned above: an interference-free multifunctional metronome for rhythm conducting is provided, including a bottom plate, a control switch with a plug and a controller of a stepping motor, with a drive of the stepping motor, a DC switch power supply I, a stepping motor, a transmission mechanism, a driving mechanism and a pedal being provided on the bottom plate; the control switch with a plug is connected to the controller of the stepping motor through a circuit; the controller of the stepping motor is connected to the drive of the stepping motor and the DC switch power supply I through circuits, respectively; the drive of the stepping motor is connected to the DC switch power supply I and the stepping motor through circuits, respectively; the output shaft of the stepping motor is connected to the transmission mechanism; the transmission mechanism is connected to the driving mechanism; and, the driving mechanism is connected to the pedal through a connector.

Further, the connector is an L-shaped connecting belt.

Further the transmission mechanism is a belt transmission mechanism or a gear transmission mechanism.

Further, the driving mechanism includes a driving shaft and a driven shaft on which two groups of transmission wheels are provided, respectively, and the transmission wheels of the driving shaft are connected to the corresponding transmission wheels of the driven shaft through belts.

Further, a DC switch power supply II, an inductive switch and a loudspeaker are further provided, the DC switch power supply II being connected to the inductive sensor, the loudspeaker and the DC switch power supply I through circuits, respectively, the inductive switch being connected to the pedal and the loudspeaker, respectively.

Further, a pedal switch is further provided, the pedal switch being connected to the controller of the stepping motor through a circuit.

From the origin of music, during teaching, learning and playing, teachers or conductors will beat with their hands and batons to facilitate the accomplishment of teaching and playing, while learners or performers realize the rhythm synchronization and interaction by beating with their feet. On this basis, in the present invention, beating with feet is actively simulated by a pedal. In such a way, first, a learner beats synchronously to the pedal by placing his or her feet on the pedal, thus realizing no interference, rhythm interaction between music and human body, and accurate beating time; and second, by playing different types of rhythms and accompaniments by a loudspeaker, the rhythm metronome may be perfectly combined with electronic accompaniments, thus really realizing the interaction between teaching and learning and the multiple functions, and facilitating better leaning and playing a long. Accordingly, students can actually master the beat and rhythm immediately when they begin to learn a song, thus to meet more and higher learning requirements.

Compared with the prior art, the present invention has the following advantages. First, there will be no sound of "Da-Da-Da" in use and thus no interference to users, and the metronome for rhythm conducting may make the users' attention more concentrated, so that the users may pay more attention to the relationship between beat and rhythm, master the rhythm relationship between the beats quickly, make a progress and read the notes effectively; mastering the rhythm and making a progress effectively may enhance a student's interests in music and imaginations; teachers, beginners or intermediate, senior and professional performers all may long-term use this metronome to master the accurate beating time; for teachers and beginners, this metronome seems like a silent teacher who always keeps a student under supervision and may realize interactive teaching and learning at any time; for intermediate performers, this metronome may be a powerful tool with higher efficiency, no error and no interference; and for senior and professional performers, this metronome acts like a silent baton with accurate beating time. Second, like beating, the pedal of this metronome moves up and down, where a beat begins when the pedal moves down and the second half of beat begins when the pedal moves up; just because of this rhythm, one beat is divided into a first half of rhythm and a second half of rhythm, so that the body movement is effectively controlled, the rhythm rule of the second half of beat is effectively mastered by students; as a result, a learner will not confuse the accurate time of each note in one beat and thus will not result in not following the beat and rhythm for slow beats; moreover, it is impossible for a leaner to play a same song wrongly once he/she feels the rhythm by this metronome, and he/she will be immediately aware of wrong parts even through playing those parts wrongly; the most important is that he/she will not get confused and thus actually master the rhythm; consequently, the body movement may be effectively controlled by the mind of the performers, each action of the body may be controlled by the rhythm, and a user may accurately master the beat time. Third, a user is not required to count beats by listening to sound and nor to calculate the time interval of "Da-Da-Da" in the mind, instead, directly acquires the silent beats of the rhythm, in this way, the user may be fully relaxed in mind and unconsciously release other capacities, and the thinking capabilities and imaginations of the user will not be restricted; accordingly, it is convenient to master the rhythm quickly, and realize more concentrated learning and effectively enhanced imaginations. Fourth, conductors and singers may often beat with their hands or feet during reading and sight-singing, and this metronome may provide them silent, interference-free and accurate beating time. Fifth, this metronome is multifunctional: in the past, only electronic pianos may have electronic accompaniment instruments but without any rhythm function, in contrast, the perfect combination of this interference-free metronome with an electronic accompaniment instrument may meet all persons who learn music and different instrumental music and persons who have higher learning requirements.

With this interference-free metronome for rhythm conducting provided by the present invention, a learner can master the rhythm better and more quickly, and the creation of music can be facilitated greatly, and more importantly, no adverse impact will be caused to users after long-term use.

DETAILED DESCRIPTION OF THE PRESENT INVENTION

Figure 1:
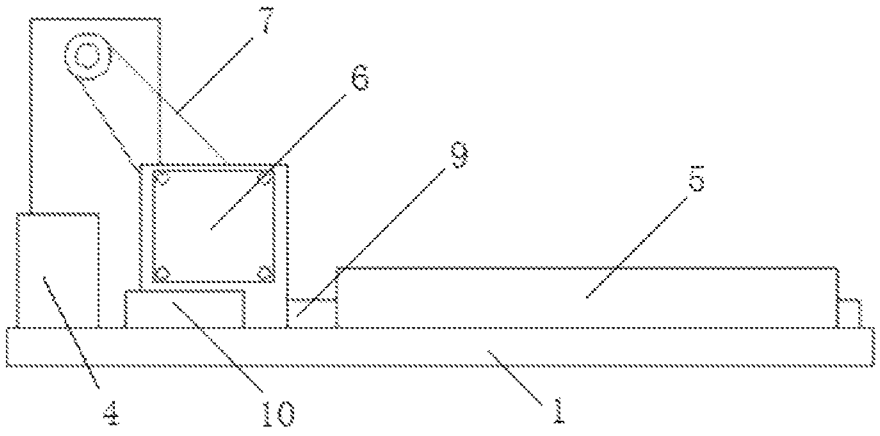
FIG. 1 is a front view of an embodiment of the present invention.
Figure 2:
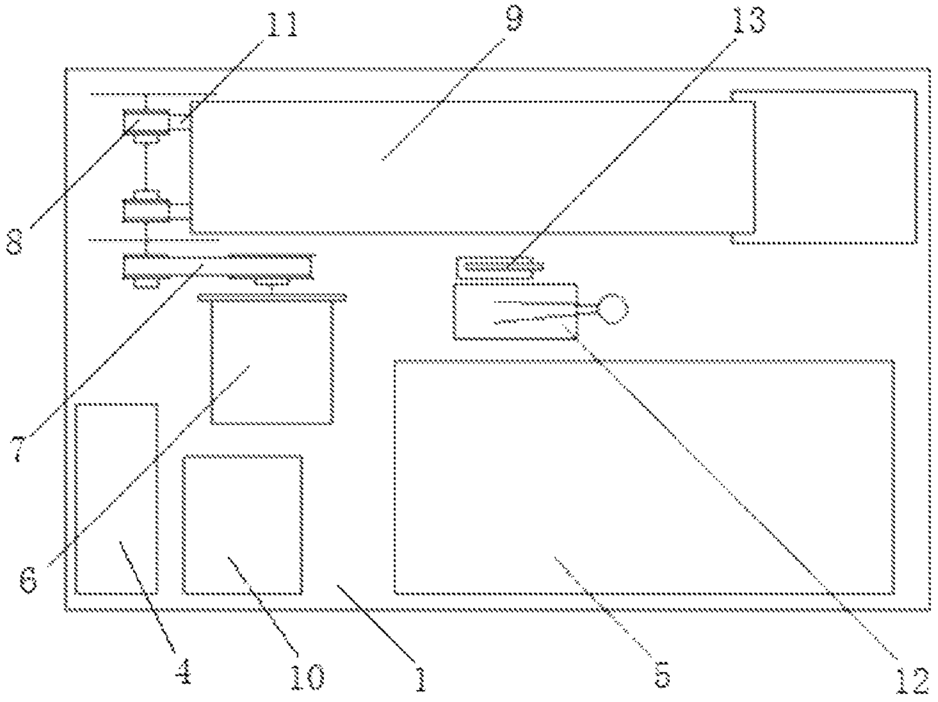
FIG. 2 is a top view of the embodiment in FIG. 1.
Figure 3:
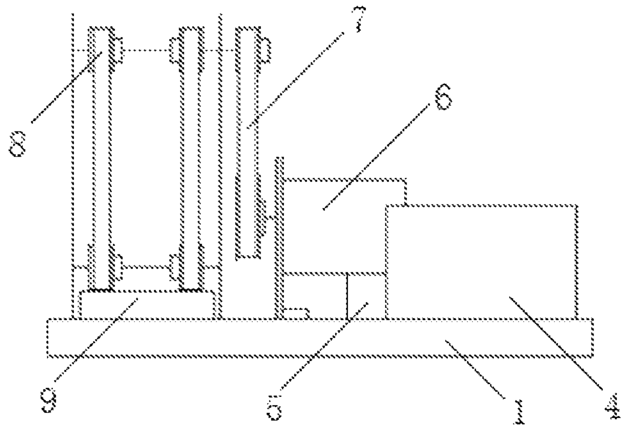
FIG. 3 is a left view of the embodiment in FIG. 1.
Figure 4:
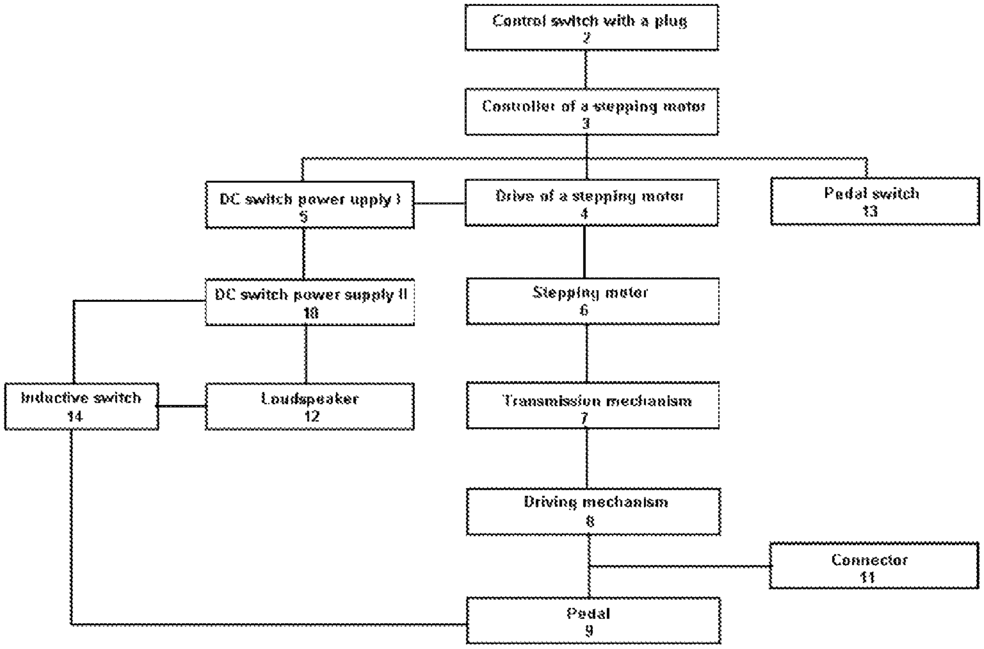
FIG. 4 is a structurally block diagram of an embodiment of the present invention.

The present invention will be further described as below with reference to the accompanying drawings by embodiments.

Referring to the drawings, this embodiment includes a base plate 1, a control switch 2 with a plug and a controller 3 of a stepping motor. A drive 4 (model: XDL-42) of the stepping motor, a DC switch power supply I 5 (model: S-25-36), a stepping motor 6 (model: 57HZ80-22), a transmission mechanism 7, a driving mechanism 8 and a pedal 9 are provided on the bottom plate 1; the control switch 2 with a plug is connected to the controller 3 of the stepping motor through a circuit; the controller 3 of the stepping motor is connected to the drive 4 of the stepping motor and the DC switch power supply I 5 through circuits, respectively; the drive 4 of the stepping motor is connected to the DC switch power supply I 5 and the stepping motor 6 through circuits, respectively; the output shaft of the stepping motor 6 is connected to the transmission mechanism 7; the transmission mechanism 7 is connected to the driving mechanism 8; the driving mechanism 8 is connected to the pedal 9 through a connector 11.

The connector 11 is an L-shaped connecting belt capable of allowing one end of the pedal 9 to do up-and-down movement from the ground. This is very beneficial for users.

The transmission mechanism 7 is a belt transmission mechanism. Of course, the transmission mechanism may also be a gear transmission mechanism, etc.

The driving mechanism 8 includes a driving shaft and a driven shaft on which two groups of transmission wheels are provided, respectively, and the transmission wheels of the driving shaft are connected to the corresponding transmission wheels of the driven shaft through belts.

A DC switch power supply II 10 (model: 12V), an inductive switch 14 and a loudspeaker 12 are further provided, with the DC switch power supply II 10 being connected to the inductive sensor 14, the loudspeaker 12 and the DC switch power supply I 5 through circuits, respectively, and the inductive switch 14 being connected to the pedal 9 and the loudspeaker 12, respectively.

A pedal switch 13 is further provided, with the pedal switch 13 being connected to the controller 3 of the stepping motor through a circuit.

Of course, the control switch 2 with a plug and the controller 3 of the stepping motor may be designed to be remotely-controlled so as to realize remote control.

Working Process:

After this metronome is powered on, the control switch 2 with a plug is activated such that the circuit is in an ON state; then, according to the specific beat desired by a user, the controller 3 of the stepping motor is set (enter by pressing "SET" and set by pressing "UP" and "DOWN": first, ten segments of pulses at most may be set by numerals "1-9" and the number of pulses may be set from 0 to 99999, here, two segments are enough, the number of pulses in the two segments of pulses must be equal, the first segment of pulse means UP while the second segment of pulse means DOWN, that is, the pedal is required to move up and down, and the up or down height of the pedal may be determined by the number of pulses, and the height may be set as 400 to 500 according to the present design requirements for synchronizer gears; second, "SP1-SP9" are used to adjust the speed of each of the ten segments, ranging from 0 to 250, where SP1 is the up speed and may be set from 30 to 60, while SP2 is the down speed and may be set as 250, in accordance with the requirements on speed; third, "DR1-DR9" are used to set the forward or backward rotation of the stepping motor, ranging from 0 to 1, where 0 is forward rotation while 1 is backward rotation; in accordance with the requirements, the pedal will move up when DRI is set as 0 and the pedal will move down when the DR2 is set as 1; fourth "TN1-TN9" may be used to set a time delay for the pedal to move down, ranging from 000 to 10.0 seconds; in accordance with the requirements on speed, "TN1-TN9" may be set as 0 or 001; fourth, "SET" may be pressed for 2 seconds to begin setting and "UP" or "DOWN" may be pressed for specific setting; "TU" may be used to set a time delay for the pedal to move up, ranging from 000 to 10.0, this is a primary parameter for setting the speed of a beat; an effective time interval between the front half of beat and the second half of beat may be set as 000 to 02.0 according to the requirements on the beating speed. Note: This is just a product under test, and it looks somewhat troublesome for some persons to set the beating speed; obviously, these setups may be made simpler and wirelessly controlled); due to the drive 4 of the stepping motor and the DC switch power supply I 5, the stepping motor 6 works and drives the transmission mechanism 7 which in turn drives the driving mechanism 8, and the driving mechanism 8 drives the pedal 9 through the L-shaped connecting belt, so that one end of the pedal 9 is allowed to move up and down from the ground, thereby realizing the rhythm. In addition, the DC switch power supply II 10 may be powered on, and the loudspeaker 12 works due to the inductive switch 14, so that the electronic accompaniment is skillfully combined with this metronome. Accordingly, the purpose of learning and enjoying is achieved in real sense, and the functions become more powerful. When this metronome is not in use, it is only needed to turn off the control switch 2 with a plug or the pedal switch 13.

I claim:

1. An interference-free multifunctional metronome for rhythm conducting, comprising a bottom plate, a control switch with a plug and a controller of a stepping motor, with a drive of the stepping motor, a DC switch power supply I, a stepping motor, a transmission mechanism, a driving mechanism and a pedal being provided on the bottom plate; the control switch with a plug is connected to the controller of the stepping motor through a circuit; the controller of the stepping motor is connected to the drive of the stepping motor and the DC switch power supply I through circuits, respectively; the drive of the stepping motor is connected to the DC switch power supply I and the stepping motor through circuits, respectively; the output shaft of the stepping motor is connected to the transmission mechanism; the transmission mechanism is connected to the driving mechanism; and, the driving mechanism is connected to the pedal through a connector.

2. The interference-free multifunctional metronome for rhythm conducting according to claim 1, characterized in that the connector is an L-shaped connecting belt.

3. The interference-free multifunctional metronome for rhythm conducting according to claim 1, characterized in that the transmission mechanism is a belt transmission mechanism or a gear transmission mechanism.

4. The interference-free multifunctional metronome for rhythm conducting according to claim 1, characterized in that the driving mechanism comprises a driving shaft and a driven shaft on which two groups of transmission wheels are provided, respectively, and the transmission wheels of the driving shaft are connected to the corresponding transmission wheels of the driven shaft through belts.

5. The interference-free multifunctional metronome for rhythm conducting according to claim 1, characterized in that a DC switch power supply II, an inductive switch and a loudspeaker are further provided, the DC switch power supply II being connected to the inductive sensor, the loudspeaker and the DC switch power supply I through circuits, respectively, the inductive switch being connected to the pedal and the loudspeaker, respectively.

6. The interference-free multifunctional metronome for rhythm conducting according to claim 1, characterized in that a pedal switch is further provided, the pedal switch being connected to the controller of the stepping motor through a circuit.

7. The interference-free multifunctional metronome for rhythm conducting according to claim 2, characterized in that the transmission mechanism is a belt transmission mechanism or a gear transmission mechanism.

8. The interference-free multifunctional metronome for rhythm conducting according to claim 2, characterized in that the driving mechanism comprises a driving shaft and a driven shaft on which two groups of transmission wheels are provided, respectively, and the transmission wheels of the driving shaft are connected to the corresponding transmission wheels of the driven shaft through belts.

9. The interference-free multifunctional metronome for rhythm conducting according to claim 2, characterized in that a DC switch power supply II, an inductive switch and a loudspeaker are further provided, the DC switch power supply II being connected to the inductive sensor, the loudspeaker and the DC switch power supply I through circuits, respectively, the inductive switch being connected to the pedal and the loudspeaker, respectively.

10. The interference-free multifunctional metronome for rhythm conducting according to claim 2, characterized in that a pedal switch is further provided, the pedal switch being connected to the controller of the stepping motor through a circuit.

* * * * *